(12) United States Patent
Dussinger et al.

(10) Patent No.: US 6,655,858 B1
(45) Date of Patent: Dec. 2, 2003

(54) CAMERA WITH COVER ATTACHMENT MOVABLE TO ACTUATE OPERATIONAL DEVICE

(75) Inventors: Thomas E. Dussinger, Henrietta, NY (US); Anna C. Schelling, Rochester, NY (US); Jude A. Sangregory, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/164,650

(22) Filed: Jun. 6, 2002

(51) Int. Cl.[7] .......................... G03B 17/00; G03B 17/02
(52) U.S. Cl. ..................... 396/448; 396/6; 396/540; 396/541; 396/543
(58) Field of Search ......................... 396/6, 448, 535, 396/540, 541, 543

(56) References Cited

U.S. PATENT DOCUMENTS

| | | | | |
|---|---|---|---|---|
| 5,559,573 A | * | 9/1996 | Kamoda et al. | 396/536 |
| 5,930,529 A | | 7/1999 | Linnane | 396/6 |
| 6,449,430 B1 | * | 9/2002 | Tasaka et al. | 396/6 |

FOREIGN PATENT DOCUMENTS

| | | |
|---|---|---|
| JP | 2-41250 | 3/1990 |
| JP | 07-128804 | 5/1995 |
| JP | 11-119335 | 4/1999 |
| JP | 11-183980 | 7/1999 |
| JP | 11-194398 | 7/1999 |
| JP | 11-258661 | 9/1999 |
| JP | 11-327003 | 11/1999 |
| JP | 11-352546 | 12/1999 |
| JP | 2000-002911 | 1/2000 |

* cited by examiner

*Primary Examiner*—Russell Adams
*Assistant Examiner*—Rochelle Blackman
(74) *Attorney, Agent, or Firm*—Roger A. Fields

(57) ABSTRACT

A camera includes a main body part, a pair of front and rear cover parts that house the main body part between them, and a cover attachment to the front cover part. An operational device is mounted on the main body part to be included within the front and rear cover parts, and is depressible to be activated. The front cover part has a hole positioned over the operational device to permit the operational device to be accessed through the hole to be depressed. The cover attachment to the front cover part covers the hole in the front cover part to conceal the hole, and has an actuating member that is depressible through the hole to depress the operational device.

1 Claim, 2 Drawing Sheets

CAMERA WITH COVER ATTACHMENT MOVABLE TO ACTUATE OPERATIONAL DEVICE

FIELD OF THE INVENTION

The invention relates generally to cameras such as so-called disposable single-use or one-time-use cameras, and in particular to camera with a decorative and functional cover attachment.

BACKGROUND OF THE INVENTION

General

Film and cameras that are all in one, commonly referred to as disposable single-use or one-time-use cameras, have become well known. The one-time-use camera is a simple point-and-shoot type camera comprising a conventional film cartridge within a cartridge receiving chamber in a main body part, an unexposed film roll prewound from the film cartridge onto a film supply spool within a film supply chamber in the main body part, a film-exposing backframe opening between the cartridge receiving and film supply chambers in the main body part, a fixed-focus taking lens, a film metering mechanism with a rotatably supported metering sprocket that has respective sprocket teeth for engaging the filmstrip at successive film perforations, a manually rotatable film winding thumbwheel coaxially engaged with a film winding spool inside the film cartridge, a single-blade shutter, a manually depressible shutter release button, an exposure counter wheel that has a numerical series of evenly spaced exposure count indicia and is incrementally rotated to successively view the exposure count indicia, an anti-backup pawl that engages the exposure counter wheel to prevent its reverse rotation, a direct see-through viewfinder having front and rear viewfinder lenses, and in some models an electronic flash. A pair of separate front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

After each picture is taken with the one-time-use camera, the photographer manually rotates the thumbwheel in a film winding direction to similarly rotate the film winding spool inside the film cartridge. This winds an exposed frame of the filmstrip from the backframe opening into the film cartridge and advances an unexposed frame of the filmstrip from the unexposed film roll to the backframe opening. The rewinding movement of the filmstrip the equivalent of slightly more than one frame width rotates the metering sprocket in engagement with the filmstrip to decrement the exposure counter wheel to its next lower-numbered indicia and to pivot a metering lever into engagement with the thumbwheel in order to prevent further manual rotation of the thumbwheel in the film winding direction. Manually depressing the shutter release button to take another picture pivots the metering lever out of engagement with the thumbwheel to permit renewed rotation of the thumbwheel in the film winding direction. When the maximum number of exposures available on the filmstrip have been made and the filmstrip is completely wound into the film cartridge, the one-time-use camera is given to a photofinisher who breaks away a cover door portion of the rear cover part from the main body part and removes the film cartridge with the exposed filmstrip from the cartridge receiving chamber. Then, he removes the exposed filmstrip from the film cartridge to develop the latent images and make prints for the customer.

Jap. Published Application No. 11-258661-Published Sep. 24, 1999

This publication discloses a one-time-use camera in which a mask plate is positioned between the front cover part and a decorative cover attachment to the front cover part which only partially covers the front cover part. The mask plate is rotatable about a taking lens mount protruding from a lens mount opening in the front cover part, to change the format (aspect ratio) of an object image seen in the viewfinder. A change-over actuator coupled with the mask plate is manually slidable within a curved slot in the cover attachment, to rotate the mask plate.

SUMMARY OF THE INVENTION

According to one aspect of the invention, a camera comprising a main body part, a pair of front and rear cover parts that house the main body part between them, and a cover attachment to the front cover part, is characterized in that:

an operational device is mounted on the main body part to be included within the front and rear cover parts, and is depressible to be activated;

the front cover part has a hole positioned over the operational device to permit the operational device to be accessed through the hole to be depressed; and the cover attachment to the front cover part covers the hole in the front cover part to conceal the hole, and has an actuating member that is depressible through the hole to depress the operational device.

According to another aspect of the invention, a method of activating an operational device that is mounted on a main body part in order to be included within a pair of front and rear cover parts that house the main body part between them in a camera, comprises:

locally depressing a cover attachment to the front cover part at an area of the cover attachment that covers a hole in the front cover part positioned over the operational device; and moving an actuating member on the front cover part through the hole to activate the operational device when the cover attachment is locally depressed at the area of the cover attachment that covers the hole.

DETAILED DESCRIPTION OF THE INVENTION

The invention is disclosed as being embodied preferably in a disposable one-time-use camera. Because the features of a one-time-use camera unit are generally known, the description which follows is directed in particular only to those elements forming part of or cooperating directly with the disclosed embodiment. It is to be understood, however, that other elements may take various forms known to a person of ordinary skill in the art.

Figure 1:
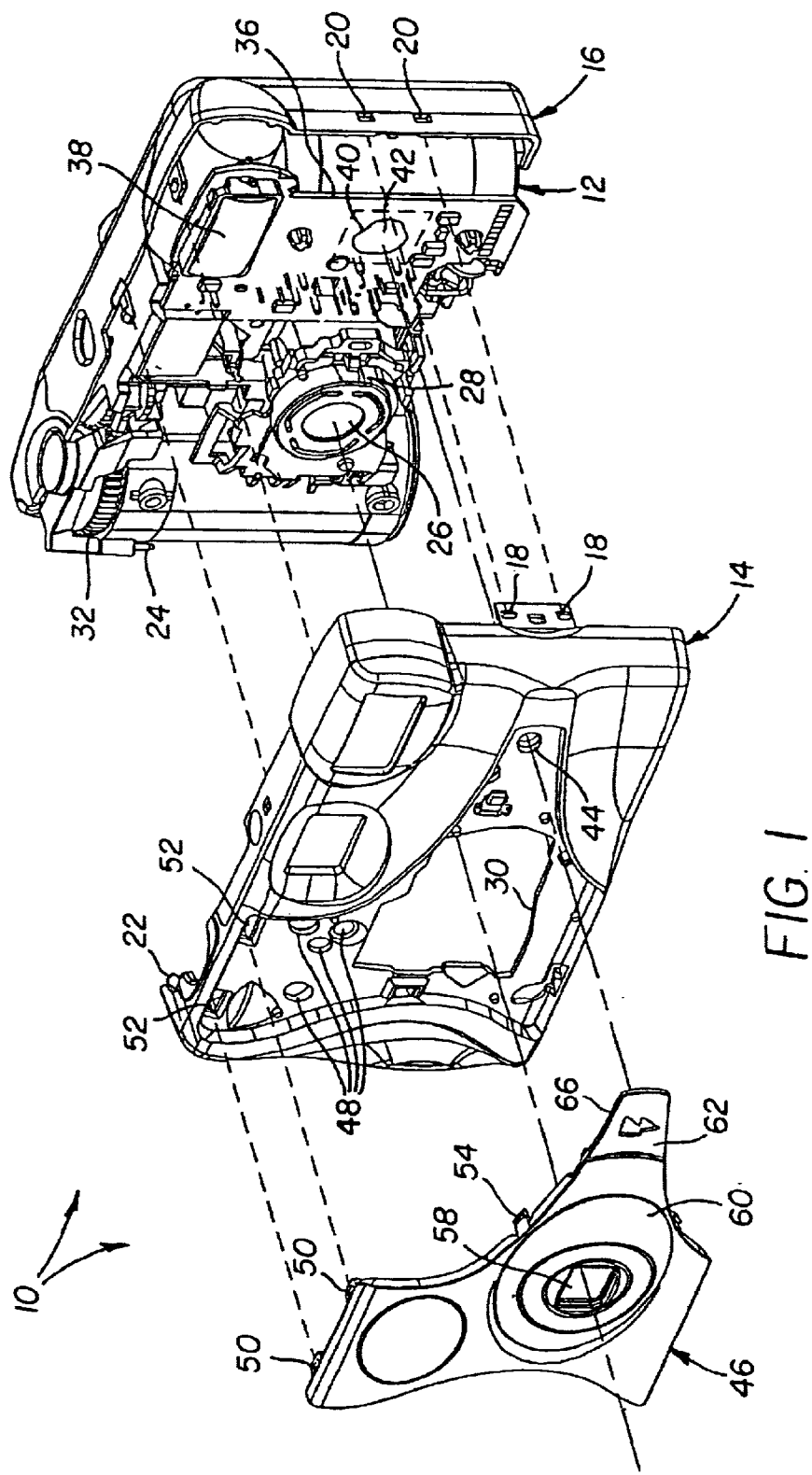
FIG. 1 is a front, exploded, side perspective view of a camera according to a preferred embodiment of the invention.
Figure 2:
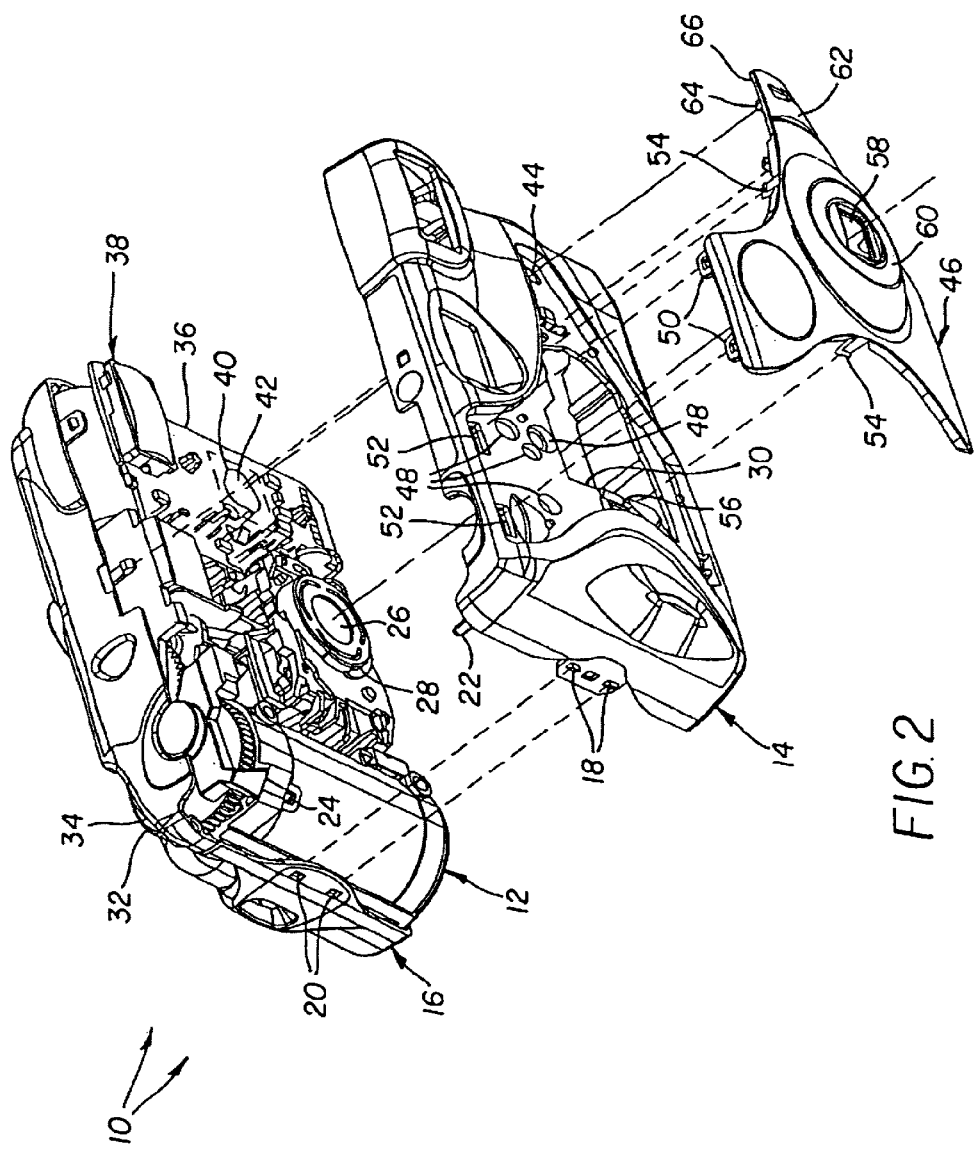
FIG. 2 is a front, exploded, top perspective view of the camera shown in FIG. 1.

Referring now to the drawings, FIGS. 1 and 2 show a disposable one-time-use camera 10 including a black-colored plastic opaque interior main body part 12, a black-colored plastic opaque exterior front cover part 14, and a black-colored plastic opaque exterior rear cover part 16. The front cover part 14 and the rear cover part 16 house the main body part 12 between them and are connected releasably to one another and to the main body part 12 via known hook-and pin-in-hole connections such as the hooks 18 on the front cover part 14 that are engaged in the holes 20 in the rear cover part 16 and the pin 22 on the front cover part that is received in the hole 24 in the main body part 12.

As is typical, the main body part 12 has a rearwardly open cartridge receiving chamber for a conventional film cartridge and a rearwardly open film supply chamber for an unexposed film roll on a rotatable film supply spool (not shown). During assembly of the camera 10, an unexposed filmstrip is substantially prewound from a rotatable film winding spool in the film cartridge and into the unexposed film roll on the film supply spool (not shown). A rearwardly open backframe opening is located between the cartridge receiving chamber and the film supply chamber for exposing successive frames of the filmstrip (not shown) when ambient light is received through a front taking lens 26 within a projecting lens mount 28 mounted on the main body part 12. The lens mount 28 protrudes through a lens mount opening 30 on the front cover part 14. See FIGS. 1 and 2.

A rotatable film winding thumbwheel 32 coaxially engages the film winding spool in the film cartridge. The thumbwheel 32 radially protrudes from an elongate narrow opening 34 in the rear cover part 16 in order to be manually grasped or fingered at its periphery to incrementally rotate the thumbwheel in a film winding direction, i.e., counter-clockwise in FIGS. 1 and 2 to similarly rotate the film winding spool. This is done in order to wind an exposed frame of the filmstrip from the backframe opening into the film cartridge after each film exposure, and to move a fresh frame of the filmstrip from the unexposed film roll to the backframe opening.

A flash circuit board 36 for a known-type electronic flash 38 is mounted on the main body part 12 and includes a known-type resilient depressible flash charge dome switch 40 that is intended to be depressed at a center area 42 to be activated. When activated, the dome-switch 40 begins flash charging to ready the electronic flash 38 to be fired.

The front cover part 14 has a hole 44 positioned over the center area 42 of the dome-switch 40. The hole 44 permits the center area 42 to be accessed through the hole in order to depress the center area to activate the dome-switch 40.

A decorative and functional silver-colored plastic cover attachment 46 to the front cover part 14 only partially covers the front cover part 14 to permit the front cover part to be visible adjacent the cover attachment for decorative purposes. The cover attachment 46 covers the front cover part 14 directly; that is, there is no intervening part between the cover attachment and the front cover part.

The cover attachment 46 covers the hole 44 in the front cover part and covers several other holes 48 in the front cover part, to conceal each one of the holes. The holes 48 are referred to as "defeat" holes, and they are used during camera manufacture to access certain components on the main body part 12 to temporarily disable them when the front cover part 14 is connected to the main body part.

The cover attachment 46 is connected to the front cover part 14 by means of several u-shaped catches 50 that couple with catch-engaging lugs (not shown) in respective slots 52 in the front cover part and several resilient hooks 54 that couple with respective hook-engaging holes 56 in the front cover part. See FIG. 1.

The cover attachment 46 has a lens opening 58 that reveals the taking lens 26 and an eliptically-shaped lens bezel 60 that surrounds the lens opening.

A resilient cantilevered portion 62 of the cover attachment 46 longitudinally extends over the hole 44 in the front cover part 14 and is manually depressible toward the hole. An actuating member or switch activating projection 64 projects from an inside surface 66 of the cantilevered portion 62 part-way into the hole 44, to be depressed through the hole 44 when the cantilevered portion is manually depressed. The actuating member 64 then depresses the center area 42 of the dome-switch 40 to activate the dome-switch. See FIGS. 1 and 2.

Method

A method of activating the dome-switch 40 is as follows:

the cantilevered portion 62 of the cover attachment 46 is manually depressible toward the hole 44 in the front cover part 14; and this moves the actuating member 64 on the inside surface 66 of the cantilevered portion 62 through the hole 44 to depress the center area 42 of the dome-switch 40 to activate the dome-switch. See FIGS. 1 and 2.

The invention has been described in detail with particular reference to certain preferred embodiments thereof, but it will be understood that variations and modifications can be effected within the spirit and scope of the invention. For example, instead of the dome-switch 40 being included other known-type operational devices that are depressed to be activated may be used.

PARTS LIST 10. one-time-use camera
12. main body part
14. front cover part
16. rear cover part
18. hooks
20. holes
22. pin
24. hole
26. taking lens
28. projecting lens mount
30. lens mount opening
32. film winding thumbwheel
34. narrow opening
36. flash circuit board
38. electronic flash
40. dome-switch
42. center area
44. hole
46. cover attachment
48. holes
50. u-shaped catches
52. slots
54. hooks
56. hook-engaging holes
58. lens opening
60. lens bezel
62. cantilevered portion
64. actuating member or switch activating projection
66. inside surface

What is claimed is:

1. A camera comprising a main body part, a pair of front and rear cover parts that house said main body part between them, and a cover attachment to said front cover part, is characterized in that:

an operational device is mounted on said main body part to be included within said front and rear cover parts, and is depressible to be activated;

said front cover part has a lens mount opening, and has a hole positioned over said operational device to permit the operational device to be accessed through said hole to be depressed;

a projecting lens mount including a taking lens is mounted on said main body part and protrudes through said lens mount opening, and said cover attachment to said front cover part covers said hole in the front cover part to conceal the hole, has an actuating member that is depressible through said hole to depress said operational device, has a lens opening that reveals said taking lens, and has an eliptically-shaped lens bezel surrounding said lens opening.

* * * * *